United States Patent
Cohen (10) Patent No.: US 8,386,335 B1
(45) Date of Patent: Feb. 26, 2013

(54) CROSS-REFERENCING COMMENTS

(75) Inventor: Gabriel A. Cohen, Alameda, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/249,673

(22) Filed: Sep. 30, 2011

Related U.S. Application Data (63) Continuation of application No. 13/079,334, filed on Apr. 4, 2011.

(51) Int. Cl.
*G06Q 30/00* (2012.01)
(52) U.S. Cl. .................. 705/26.64; 705/26.1; 705/26.7; 705/27.1
(58) Field of Classification Search .................... 705/26, 705/27, 26.1, 27.1, 26.64, 26.7
See application file for complete search history.

(56) References Cited

U.S. PATENT DOCUMENTS

| | | | |
|---|---|---|---|
| 7,062,509 B1 | 6/2006 | Nenov et al. | |
| 7,296,015 B2 | 11/2007 | Poltorak | |
| 7,558,769 B2 | 7/2009 | Scott et al. | |
| 7,603,350 B1 | 10/2009 | Guha | |
| 7,788,358 B2 | 8/2010 | Martino | |
| 7,930,302 B2 * | 4/2011 | Bandaru et al. | 707/737 |
| 7,953,736 B2 * | 5/2011 | Rinearson et al. | 707/736 |
| 8,108,255 B1 | 1/2012 | Robinson et al. | |
| 8,112,234 B2 | 2/2012 | Duret et al. | |
| 8,121,902 B1 | 2/2012 | Desjardins et al. | |
| 2005/0240618 A1 | 10/2005 | Nickerson et al. | |
| 2006/0009994 A1 | 1/2006 | Hogg et al. | |
| 2007/0011073 A1 | 1/2007 | Gardner et al. | |
| 2007/0043583 A1 | 2/2007 | Davulcu et al. | |
| 2007/0143122 A1 | 6/2007 | Holloway et al. | |
| 2008/0091547 A1 | 4/2008 | Baker | |
| 2008/0091549 A1 * | 4/2008 | Chang et al. | 705/26 |
| 2008/0215571 A1 * | 9/2008 | Huang et al. | 707/5 |
| 2009/0063247 A1 | 3/2009 | Burgess et al. | |
| 2009/0198593 A1 | 8/2009 | Klug et al. | |
| 2009/0265332 A1 | 10/2009 | Mushtaq et al. | |
| 2009/0281870 A1 * | 11/2009 | Sun et al. | 705/10 |
| 2009/0299824 A1 | 12/2009 | Barnes, Jr. | |
| 2010/0228604 A1 | 9/2010 | Desai et al. | |
| 2010/0250336 A1 * | 9/2010 | Selinger et al. | 705/10 |

OTHER PUBLICATIONS

"Visual Opinion Analysis of Customer Feedback Data," by Daniela Oelke et al., IEEE Symposium on Visual Analytics Science and Technology (VAST): Atlantic City, New Jersey, Oct. 12-13, 2009, proceedings, pp. 187-194.*
"In-Text Ad Formats," Vibrant, brochure, reprinted from http://www.vibrantmedia.com/in-text_advertising/in-text_formats.asp on Mar. 31, 2011, 4 pages.
Lei Zhang and Bing Liu. "Extracting and Ranking Product Features in Opinion Documents." Proceedings of the 23rd International Conference on Computational Linguistics (COLING-2010), Aug. 23-27, Beijing, China, 9 pages.
Nitin Jindal and Bing Liu. "Review Spam Detection." Proceedings of WWW-2007 (poster paper), May 8-12, Banff, Canada, 2 pages.

(Continued)

*Primary Examiner* — Jeffrey A Smith
*Assistant Examiner* — Anne Georgalas
(74) *Attorney, Agent, or Firm* — Fish & Richardson P.C.

(57) ABSTRACT

Methods, systems, and apparatuses, including computer programs encoded on a computer storage medium, for cross-referencing comments. In one aspect, a method includes, identifying unstructured text in a document associated with a first product or provider, in the unstructured text, identifying, by the one or more computers, a reference to a second product or provider different from the first product or provider, determining a relationship between the first product or provider and the second product or provider based on content of the unstructured text, and providing an indication of the relationship for display on a document associated with the first product or provider or the second product or provider.

21 Claims, 5 Drawing Sheets

OTHER PUBLICATIONS

Ee-Peng Lim, Viet-An Nguyen, Nitin Jindal, Bing Liu adn Hady Lauw. "Detecting Product Review Spammers using Rating Behaviors." to appear in the 19th ACM International Conference on Information and Knowledge Management (CIKM-2010, full paper), Toronto, Canada, Oct. 26-30, 2010, 10 pages.

Bing Liu. "Sentiment Analysis and Subjectivity." Invited Chapter for the Handbook of Natural Language Processing, Second Edition. Mar. 2010, 38 pages.

Xiaowen Ding, Bing Liu and Philip S. Yu. "A Holistic Lexicon-Based Appraoch to Opinion Mining." Proceedings of First ACM International Conference on Web Search and Data Mining (WSDM-2008), Feb. 11-12, 2008, Stanford University, Stanford, California, USA, 9 pages.

Bing Liu. "Opinion Mining." Invited contribution to Encyclopedia of Database Systems, 2008, 7 pages.

Minqing Hu and Bing Liu. "Mining and summarizing customer reviews." Proceedings of the ACM SIGKDD International Conference on Knowledge Discovery & Data Mining (KDD-2004, full paper), Seattle, Washington, USA, Aug. 22-25, 2004, 10 pages.

"Opinion Mining, Sentiment Analysis, Opinion Extraction" http://www.cs.uic.edu/~liub/FBS/sentiment-analysis.html (retrieved on May 14, 2012) (8 pages).

"How Peryskop harnesses the power of product reviews to enhance product selection" http://www.nicolasleroy.fr/wp/2010/08/how-peryskop-harnesses-the-power-of-product-reviews-to-enhance-product-selection/ (Aug. 25, 2010), 6 pages.

http://www.peryskop.pl/produkt/611/SONY+CYBER-SHOT+DSC-HX1 (retrieved May 14, 2012) and English translation, 6 pages.

"TheFind launches price comparison service" http://www.nicolasleroy.fr/wp/2009/11/thefind-launches-price-comparison-service/ (Nov. 19, 2009), 6 pages.

"In-Text Demo," Vivrant, brochure, reprinted from http://www.vibrantmedia.com/in-text_advertising/demo.asp on Mar. 31, 2011, 2 pages.

"In-Text Ad Formats," Vibrant, brochure, reprinted from http://www.vibrantmedia.com/in-text_advertising/in-text_formats.asp on Mar. 31, 2011, 2 pages.

Office Action for U.S. Appl. No. 13/079,334 dated Nov. 21, 2011, 27 pages.

Office Action issued in U.S. Appl. No. 13/079,334 on Jun. 6, 2012, 40 pages.

* cited by examiner

CROSS-REFERENCING COMMENTS

CROSS-REFERENCING COMMENTS

Cross-Reference to Related Applications

This application is a continuation of and claims priority from U.S. patent application Ser. No. 13/079,334, filed on Apr. 4, 2011, the contents of which are incorporated herein by reference in their entirety.

TECHNICAL FIELD

This document generally describes techniques for cross-referencing comments.

BACKGROUND

The Internet offers consumers a rich shopping experience. A wide variety of products are available from diverse sellers located all over the world. Often, transactions can be completed with minimal effort. In addition, consumers have access to vast amounts of information to inform their purchases. This information is often provided by manufacturers, retailers, and others. Consumers also have the opportunity to provide information in personal web pages, blogs, and comments on web sites.

SUMMARY

References to products in unstructured text, such as product review comments, can be identified. Relationships between products can be correlated and used to rank the relative quality and popularity of the products referenced and to cluster related products. Cross-referenced information about the products, such as relationships between products and the relative quality of products, are provided to help consumers navigate the marketplace and make informed purchases.

In general, an innovative aspect of the subject matter described in this specification can be embodied in methods that include the actions of, in a document including unstructured text, identifying, by one or more computers, a reference to a first product or provider; in the unstructured text, identifying, by the one or more computers, a reference to a second product or provider different from the first product or provider; determining a relationship between the first product or provider and the second product or provider based on content of the unstructured text; and providing an indication of the relationship for display on a document associated with the first product or provider or the second product or provider. Other embodiments of this aspect include corresponding systems, apparatus, and computer programs, configured to perform the actions of the methods, encoded on computer storage devices.

These and other embodiments can optionally include one or more of the following features. For example, identifying a reference to the first product or provider in the unstructured text. Providing an indication of the relationship for display comprises cross-referencing the unstructured text with second unstructured text in a second document. Adding a hyperlink to the reference to the second product or provider, and the hyperlink provides access to information associated with the second product or provider. The unstructured text includes a comment associated with a web page offering the first product for sale. Determining a relationship includes determining, based on the unstructured text, that the first product and the second product are supplements or alternatives. Determining a relationship includes identifying a direct comparison between the first product or provider and the second product or provider. Ranking the first product or provider and the second product or provider based on the relationship, where providing an indication of the relationship includes indicating the ranking of the first product or provider and the second product or provider. Providing an indication of the relationship includes suggesting purchase of the second product. Providing an indication of the relationship includes suggesting, on a web page associated with the second product, purchase of the first product. Providing an indication of the relationship includes providing a navigational tool based on the relationship.

Particular embodiments of the subject matter described in this specification can be implemented so as to realize one or more of the following advantages. Relationships between products and providers can be determined from unstructured text. Information in multiple comments can be cross-referenced and indicated to consumers, whether the comments occur in a single document or in multiple documents.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Described herein are techniques that may be used to cross-reference information in user-generated text on web pages. The techniques described can be used to provide information about products offered in an online marketplace based on comments submitted by consumers. For example, information about the popularity and quality of various products can be provided. To provide this information, references to products can be identified in comments submitted by consumers. Comparisons between products and other relationships indicated in the comments can be used to provide consumers better information to make purchasing decisions.

Some web pages allow consumers to submit free-form comments or product reviews. In the comments, consumers may express their opinions of a product or a brand. These comments provide useful information about products that are offered for sale. In particular, references to particular brands and product names in consumer comments can provide valuable information to consumers. For example, comparisons between products can indicate which products are best and can make consumers aware of new purchasing options.

Unfortunately, consumers may have difficulty making full use of the information in the comments. When consumers read the name of an unfamiliar product, they may not recognize what type of product is referenced or how the product is related to other products. Recognizing product references in comments can be difficult when product names are abbreviated or incomplete. In some cases, consumers may become frustrated by the difficulty of reading the unstructured text of consumer-generated comments. In addition, comments are often scattered across many different web pages, which makes it difficult for consumers to locate comments relevant to their interests. Finally, the sheer volume of comments provides more information than consumers have time to evaluate.

Because consumers often lack the time and ability to consider all the comments that relate to products of interest, summarized information can be provided to consumers. A comment analysis system can analyze and cross-reference multiple comments, including comments on multiple web pages.

The comment analysis system can identify references to products in the comments, and can cross reference the information in the comments based on the references. The comment analysis system can determine relationships between products based on the identified references. For example, the comment analysis system can determine whether two products are substitutes or complements for each other. In addition, the comment analysis system can determine whether one product is of higher quality than another product based on relationships suggested in the comments. The comment analysis system can cross-reference the relationships to provide useful information to consumers that visit multiple web pages.

As an example, on a web page offering product A for sale, a comment from a consumer may mention a different product, such as product B. For example, the comment may state, "I like product B better than product A." This comment may be useful to consumers that visit the web page for product A, and may also be useful to consumers who are interested in product B. However, many visitors to the web page may overlook the comment and fail to appreciate that product B is a valid option. In addition, because the comment is displayed on a web page for product A, only consumers that navigate to the web page for product A will see the comment. Consumers that navigate to a web page associated with product B may never benefit from the information in the comment.

To provide better information to consumers, the comment analysis system can cross-reference the information in the comment. For example, the comment analysis system can first identify the references to product A and product B in the comment. The comment analysis system can then determine that product A and product B are competing alternatives and that, at least to one consumer, product B is better than product A. The comment analysis system can cross-reference these relationships with relationships determined using references to product A and product B in other comments, including comments on other web pages. Finally, the comment analysis system can provide information about the relationships on a web site for product B in addition to the web site for product A. As a result, consumers that navigate to either web page benefit from the information in the comment.

The techniques described herein can be used to provide cross-referenced information in various forms. Text from comments can be provided on web pages associated with relevant products, even when the comment was not posted on the product initially. In addition, hyperlinks can be added to product references that occur in comments. The hyperlinks can direct consumers to additional information about the referenced product, for example, by directing the consumer to a web page where the referenced product is offered for sale.

As another example, information from multiple comments can be correlated to provide score or rank related products. Sentiment analysis can be used to determine the relative quality of various products. In particular, comparisons between products in comments can be used to determine how products are viewed relative to other products.

As still another example, information identifying related products can be provided to consumers. The comment analysis system can identify related products and group them together in clusters. For example, products that are substitutes for each other or are complements to each other can be grouped together. Products within a particular category and products that have a particular feature in common can also be identified. A list or other indication that products are related can be provided to consumers on a web page. In some instances, clusters of related products can be used to enhance navigation on a web page. For example, clusters of related products can populate subcategories that provide fine-grained navigational options for consumers.

As another example, consider a product review comment for an application ("app") called "e-mail wizard." The comment is posted on a web page of an online marketplace and states: "I like this app much more than e-mail king." The text "e-mail king" can be determined to represent a product other than "e-mail wizard." The reference can be identified as matching the name of the "e-mail king" product. As a result, the text "e-mail king" is displayed in the comment with a hyperlink to the product page for the "e-mail king" product. It can be determined, based on this comment and other comments, that "e-mail king" and "e-mail wizard" are alternative products for each other.

The two products ("e-mail king" and "e-mail wizard") can be indicated as alternatives on a user interface and can be recommended to consumers looking for an e-mail program. Both of the products can be included in a cluster with other e-mail programs. To help consumers locate products of this type, a control or sub-category for e-mail clients can be displayed to the consumer. Using this comment and others like it, it can be determined that "e-mail wizard" is a higher quality product than "e-mail king." An indication of the higher quality of the "e-mail wizard" product can be displayed, for example, (i) near the comment, (ii) on the product page for "e-mail king" to show consumers a higher quality choice, or (iii) on the "e-mail wizard" page to indicate that "e-mail wizard" is better than other competing products.

Figure 1:
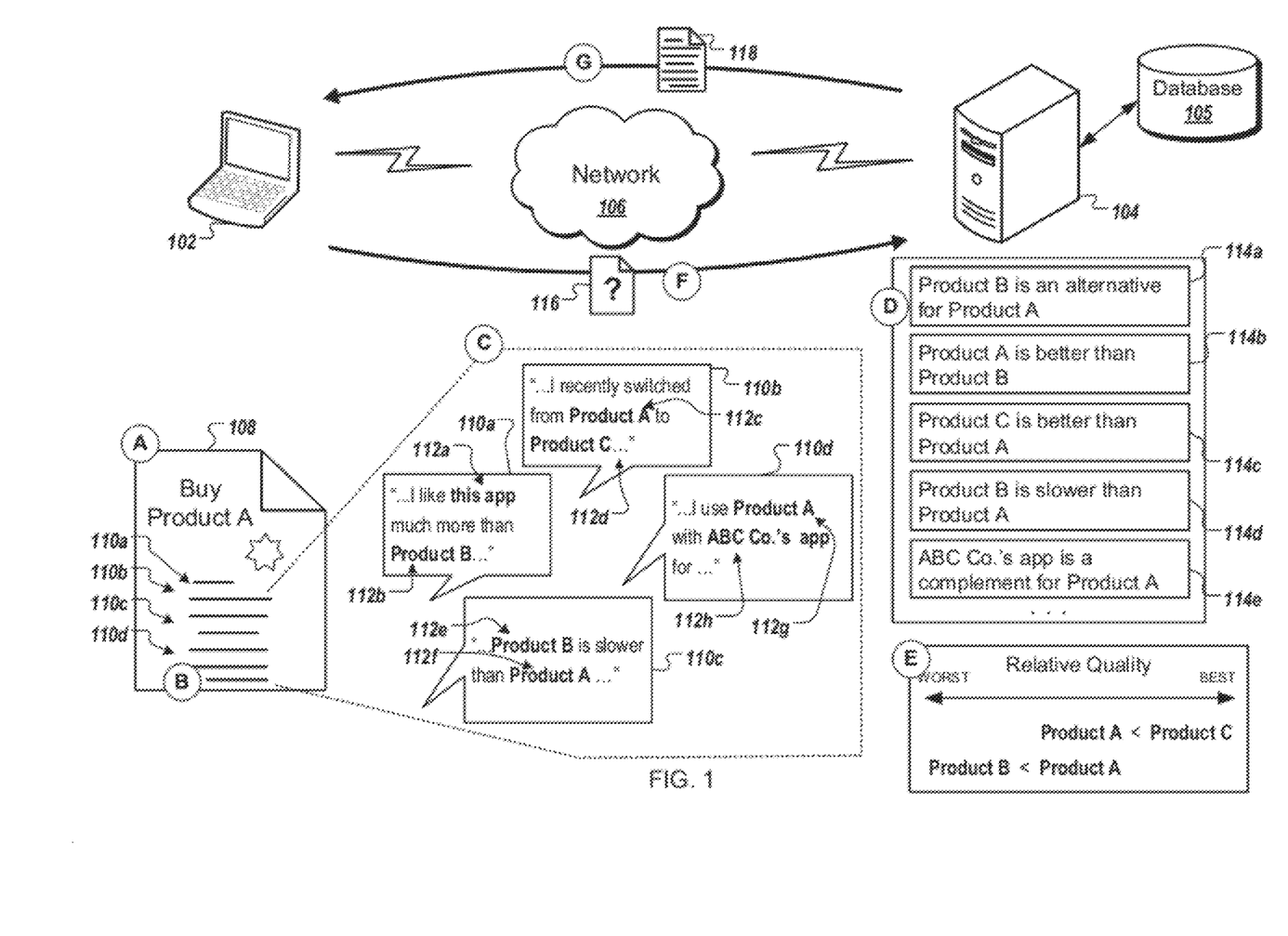
FIG. 1 is a block diagram illustrating a system that can cross-reference comments.

FIG. 1 is a diagram of a system 100 on which the foregoing techniques may be implemented. The diagram also illustrates a flow of data, shown in actions (A) to (G). Actions (A) to (G) may occur in the illustrated sequence, or they may occur in a sequence that is different than that shown.

System 100 includes a client device 102 and a server system 104, which communicate over a network 106. The system 100 includes a database 105. The server system 104 can store and retrieve information to/from the database 105 about comments and web pages. The client device 102 transmits and receives information over the network 106.

During action (A), the server system 104 accesses a document, such as a web page 108. For example, the server system 104 can access content of the web page 108 from a cache or an index stored in the database 105. In addition, or as an alternative, the server system 104 can retrieve content of the web page 108 over the network 106.

The web page 108 can be associated with a particular product or a provider of a product. In the illustrated example, the web page 108 is associated with a product called Product A, which is an application for a mobile device. The web page 108 may describe the product and may offer the product for sale. The web page 108 can be associated with a provider of a product by referencing the brand or producer. The web page 108 may or may not be affiliated with a company that produces the product.

The web page 108 can be part of a marketplace that includes web pages associated with different products of a particular type. For example, the web page 108 may be included in a marketplace that includes web pages related to different mobile applications. Another marketplace may include web pages that offer music for sale, another marketplace may include web pages related to books, and so on.

During action (B), the server system 104 identifies unstructured text in the web page 108. For example, the server system 104 can identify one or more comments 110a-110d in the web page 108, such as unstructured, consumer-generated comments. For example, the comments 110a-110d can be free-form text comments that have been submitted by one or more consumers that have visited the web page 108 or have submitted comments associated with the web page 108 by other methods. The server system 104 can identify that the unstructured text of the comments 110a-110d is consumer-generated.

The comments 110a-110d can be product reviews, forum posts, messages to other consumers, and other forms of unstructured and consumer-generated text. The comments 110a-110d may be included in the content of the web page 108 or may be referenced by the web page 108. The comments 110a-110d can be discrete sections of text associated with a particular consumer, but in some instances, the comments 110a-110d may not be identifiable as separate submissions. In some instances, the comments 110a-110d may be associated with a particular consumer or group of consumers. In other instances the comments 110a-110d can be anonymous.

The server system 104 can identify the comments 110a-110d based on the position of the comments 110a-110d on the web page 108 or based on other known characteristics of the comments 110a-110d. The server system 104 can also identify the comments 110a-110d based on various aspects of the web page 108, including, for example, its layout, metadata, styles, and other features. The server system 104 can also identify the comments 110a-110d based on the presence of names, consumer names, consumer account information, dates, and other information that occurs in the web page 108.

During action (C), the server system 104 identifies references 112a-112h to one or more products in the comments 110a-110d. The server system 104 can identify references 112a-112h to the product associated with the web page 108 and references 112a-112h to other products. For example, the server system 104 identifies (i) references 112a, 112c, 112f, 112g which refer to Product A, which is offered for sale on the web page 108, and (ii) references 112b, 112d, 112e, 112h, which refer to other products. The references 112a-112h can be textual references, and the references 112a-112h may or may not be marked by metadata.

To identify references 112a-112h, the server system 104 parses the comments 110a-110d to identify various identifiers such as product names, product codes, brand names, and company names. The server system 104 can identify occurrences of known product and provider names in the comments 110a-110d. For example, in a marketplace for a particular type of product, the server system 104 can access or generate a list of identifiers that includes product names and provider names for the products in the marketplace. The server system 104 can then perform a substring or full string matching to identify partial or exact matches to the identifiers in the list.

The server system 104 can also identify text in the comments 110a-110d that matches common misspellings of known identifiers.

Because references 112a-112h may be abbreviated or incomplete, the server system 104 can match partial references with information in the database 105 to link references 112a-112h to particular products or groups of products. In some instances, the server system 104 may also identify references to products in the web page 108 that do not occur in the comments 110a-110d. These references can provide context for the statements in the comments 110a-110d and can be used to disambiguate references 112a-112h in the comments 110a-110d. For example, the server system 104 can determine that the web page 108 is associated with Product A based on references to Product A in the URL, titles, and other content of the web page 108.

The server system 104 may identify references 112a-112h based on keywords other than names. For example, in the comment 110a, the server system 104 can determine that the text "this app" is a reference 112a to the application Product A based on the presence of the word "this." Because the web page 108 on which the text occurs is associated with Product A, the server system 104 can determine that the reference 112a of "this app" refers to Product A. In addition, the server system 104 can use syntax and punctuation in the comments 110a-110d to identify product or provider names that may not already be known. Commonalities in multiple comments, including comments from multiple web pages, can be used to identify references to products or providers.

Examples of providers of a product include authors, publishers, vendors, and manufacturers of a product. Providers can be identified by names, brand names, and other information in the comments 110a-110d that indicates the source of a product. For example, in the reference 112h, the server system 104 identifies a company "ABC Co." as a provider of a product. When a reference to a provider is identified, the server system 104 may also identify a particular product or a group of products associated with the provider. For example, the server system 104 may access additional information to determine which mobile application is being referred to in the reference 112h.

During action (D), the server system 104 uses the identified references 112a-112h to determine one or more relationships 114a-114e involving the products or providers identified in the references 112a-112h. Based on, for example, the text surrounding the references 112a-112h, the server system 104 can determine a variety of relationships 114a-114e. For example, the server system 104 can determine relationships 114a-114e based on text that includes two or more references 112a-112h that occur together in a comment 110a-110d. The server system 104 can also determine a relationship 114a-114e based on a single reference 112a-112h and the context in which the reference 112a-112h occurs. Many types of relationships can be determined, including, for example, (i) that two products have similar functionality, (ii) that two products are alternatives or complements to each other, or (iii) that one product is regarded more highly than another. The relationships 114a-114e identified by the server system 104 can be stored in the database 105.

The server system 104 can determine relationships indicated by the unstructured text in the comments 110a-110d, rather than accessing stored relationships between the products or providers. For example, the relationship(s) can be determined without looking up previously-identified relationships or stored relationships in the database 105 or in other sources. Thus relationships can be determined based on a particular comment 110a-110d or set of comments 110a-

110*d* can be relationships derived from the content of the unstructured text, and from the association of the comments 110*a*-110*d* with, for example, the web page 108 in which the comments 110*a*-110*d* occur.

In particular, the relationships 114*a*-114*e* can include comparisons between products. The server system 104 can identify comparisons by identifying keywords near the references 112*a*-112*h* that indicate a comparison, such as "better than," "worse than," "instead of," "faster," "slower," and so on. The comparisons identified by the server system 104 can be direct or indirect.

Relationships 114*a*-114*e* can also be determined from statements that include references 112*a*-112*h* but do not include comparisons. For example a statement, "I like product A, product B, and product C" can suggest that the three products have one or more attributes in common. Additional context, such as text surrounding the statement, may indicate other relationships between the referenced products.

The relationships 114*a*-114*e* identified by the server system 104 can include, for example, whether referenced products are members of a particular category. As an example, the server system 104 can determine from text surrounding references 112*a*-112*h*, including comparisons, that one product is an alternative or a substitute for another product. Similarly, the server system 104 can determine that a product is a complement or a supplement for another product.

These relationships 114*a*-114*e* may or may not be apparent based on product literature or other official sources. Comments 110*a*-110*d* from consumers can indicate practical features of products and actual uses of the products. For example, relationships 114*a*-114*e* may suggest that consumers have discovered that seemingly dissimilar products can be used as substitutes or as complements, even though marketing statements may indicate otherwise.

The examples below describe some relationships 114*a*-114*e* that can be determined from the comments 110*a*-110.

Example 1

Comment 110*a*

The comment 110*a* includes a direct comparison by stating that the consumer likes "this app much more than Product B." The server system 104 can determine that the web page 108 is associated with Product A, and thus can match the reference 112*a* to "this app" with Product A.

From the single comment 110*a*, multiple relationships 114*a*, 114*b* can be determined. For example, the server system 104 can determine that the Product A and Product B are likely alternatives to each other (the relationship 114*a*) because the comment 110*a* compares the products directly. In addition, the server system 104 can also determine that, at least to one consumer, Product A is better than Product B (the relationship 114*b*).

Example 2

Comment 110*b*

The comment 110*b* includes states that the consumer "switched from Product A to Product C," which is an indirect comparison of the two products. Even though the comment 110*b* does not explicitly compare the two products, the comment 110*b* suggests that one product (the switched-to product) is better than the other. To identify indirect comparisons, the server system 104 can identify a key phrase, such as "switched from . . . to . . . " Based on an identified key phrase, the server system 104 can determine one or more relationships that correspond to the key phrase.

For example, because the comment indicates that the consumer "switched from" one product to another, the server system 104 can determine that the Product A and Product C are substitutes for each other. In addition, because the consumer that submitted the comment 110*b* chose Product C over Product A, the server system 104 can determine that the consumer believes Product C is better than Product A (the relationship 114*c*).

Example 3

Comment 110*c*

The comment 110*c* indicates that "Product B is slower than Product A." Because Product B and Product A are directly compared in the comment 110*c*, the server system 104 can determine that the two products are likely alternatives for each.

In some implementations, the server system 104 can determine relationships 114*a*-114*e* that indicate particular aspects of the products including, for example, speed, ease of use, value, durability, suitability for a particular purpose, etc. For example, the server system 104 can determine from the comment 110*c* that Product B is slower than Product A (the relationship 114*d*). The server system 104 can also determine relationships 114*a*-114*e* that indicate the overall quality or perception of products referenced in the comments 110*a*-110*d*. For example, based on stored parameters related to the key word "slower," the server system 104 can determine that a slow product is usually inferior to a fast one. Thus the server system 104 can determine that the comment 110*c* suggests that Product B is inferior to Product A."

Example 4

Comment 110*d*

The comment 110*d* states that a consumer uses "ABC Co.'s app with Product A." This indicates that the product from "ABC Co." and Product A are complementary products (the relationship 114*e*).

Relationships 114*a*-114*e* can be determined even when a comment 110*a*-110*d* includes a single reference 112*a*-112*h*. For example, because the web page 108 is associated with Product A, the server system 104 can determine that the comments 110*a*-110*d* included in the web page 108 are related to Product A. For example, a comment included in the web page 108 may state "you should try Product B instead." Even though the comment does not reference Product A explicitly, the server system 104 can determine that Product B is an alternative for Product A because the web page 108 on which the comment is displayed is associated with Product A.

The server system 104 can use the context in which the comments 110*a*-110*d* occur to determine relationships 114*a*-114*e* between products and providers. The context can include information from other comments 110*a*-110*d* and other content of the web page 108. For example, relationships 114*a*-114*e* between products can be determined using a combination of comments 110*a*-110*d*. A sequence of three discrete comments from different consumers may include, for example:

Comment 1: "I like Product B. Do you?"
Comment 2: "Product A is better."
Comment 3: "I agree, but Product C is better than both of them." The server system 104 can use information from the first comment to determine the relationship indicated in the second comment. The server system 104 can also use information from the first and second comments to determine the relationship indicated in the third comment.

The server system 104 can determine other types of relationships 114a-114e in addition to those described above. For example the server system 104 can determine that two products both have a similar feature or that one product requires another product to function properly. Relationships 114a-114e can describe the commonalities or differences between products, or advantages or disadvantages of one product relative to another. Relationships 114a-114e can indicate relative quality or capability of a product in a particular aspect, such as speed, ease of use, or other aspects that consumers may mention in the comments.

During action (E), the server system 104 correlates multiple identified relationships 114a-114e. By correlating multiple relationships 114a-114e, the server system 104 can determine that particular products are related to each other. The server system can also determine the relative quality of the related products. The server system 104 can correlate relationships 114a-114e determined from the comments 110a-110d with other relationships determined from comments on web pages other than the web page 108.

The server system 104 can use the relationships 114a-114e to determine the relative quality of related products. The server system 104 can link direct comparisons to determine a relative ranking of related products. For example, the relationship 114c indicates that Product C is better than Product A, and the relationship 114b indicates that Product A is better than Product B. Thus the server system 104 can determine that the quality of the products, from best to worst, is Product C, then Product A, then Product B. The server system 104 can also determine relative rankings of products for specific attributes, such as speed, ease of use, price, and so on. In addition, the server system 104 can assign scores to the products indicated in the references 112a-112h based on their relative ranks or based on sentiment analysis as described above.

Sentiment analysis can be used to determine the popularity and perceived quality of products referenced in the comments 110a-110d. As an example, the server system 104 can count the number of positive and negative statements that occur near references 112a-112h to individual products. For example, the server system 104 can identify statements such as "I like ABC" and determine whether the statement indicates a positive or negative opinion of the referenced product. Such analysis may indicate, for example, that 60% of consumers have a favorable opinion of Product B. The analysis may also indicate that 70% of consumers have a favorable opinion of Product A.

Sentiment analysis can be enhanced by considering the relationships 114a-114e identified during action (D). The server system 104, by correlating instances where references 112a-112h occur together, can generate information that may not be discernable when references 112a-112h are considered in isolation. In particular, relationships 114a-114e such as direct comparisons can be used to directly address issues of interest to consumers For example, the server system 104 can consider the relationships 114a-114e identified between Product A and Product B. In other words, the server system 104 can count the number of comments 110a-110d that (i) include both a reference 112a-112h to Product A and a reference 112a-112h to Product B and (ii) indicate a difference in quality between the two products. The server system 104 may count the number of relationships 114a-114e that indicate that Product A is better than Product B. The server system 104 may also count the number of relationships 114a-114e that indicate that Product B is better than Product A. When a statement such as "Product A is better than Product B" is more common than "Product B is better than Product A," it is likely that Product A is a more desirable or higher quality product than B. The server system 104 can the compare the counts and may determine, for example, that when consumers compare Product A and Product B, consumers prefer Product A twice as often as they prefer Product B.

Sentiment analysis that considers combinations of references 112a-112h can provide information not discernable from analysis of individual references. Sentiment analysis using relationships 114a-114e may indicate, for example, that the difference in quality is greater or narrower than the statistics for individual products suggest. In some instances, sentiment analysis based on the relationships 114a-114e may suggest information contrary to the individual ratings of individual products. For example, sentiment analysis based on the relationships 114a-114e may indicate that when two products are compared side by side, consumers actually prefer the product with the lower rating. In some instances, consumers that provide direct comparisons between two products may have experience with both products, and thus may be among the most informed consumers. As a result their opinions may be especially valuable to other consumers.

The server system 104 can also group related products into categories or clusters based on the relationships 114a-114e. For example, the server system 104 can identify products that are alternatives for each other and include the alternatives in a cluster. For example, one relationship may indicate that Product A and Product C are alternatives. Another relationship may indicate that Product A and Product B are alternatives. Based on the two relationships, the server system 104 can determine that all three products, Product A, Product B, and Product C, are alternatives and thus should be included in the same cluster.

The server system 104 can correlate relationships 114a-114e determined from a variety of sources. The server system 104 can correlate multiple relationships 114a-114e identified within a single comment 110a-110d. The server system 104 can also correlate relationships 114a-114e determined from multiple comments 110a-110d on a single web page 108. The server system 104 can also correlate relationships 114a-114e determined from comments 110a-110d on multiple web pages.

For example, because the server system 104 has determined that Product A and Product C are substitutes, the server system 104 can correlate relationships 114a-114e determined from comments 110a-110d on the web page 108 and from comments on a web site associated with Product C. The server system 104 can also determine that the two products are members of a particular category of products, such as e-mail client applications, and thus can correlate the relationships determined from comments on web pages within that category. In some implementations, the server system 104 correlates references 112a-112h and surrounding information regardless of the primary focus of the web page 108 in which the reference 112a-112h occurs.

The server system 104 can repeat actions (A) through (E) to cross-reference comments from web sites in addition to the web page 108. For example, the server system 104 can cross-reference comments for each of the web pages in an online marketplace. The server system 104 can also cross-reference comments from web pages outside a particular marketplace or a particular domain.

In some implementations, the server system 104 can also take into account the overall volume of comments to isolate signal from noise when determining a relative (stack) ranking of products. For example, the relative quality of a product may be determined only when a number of comments 110a-110d that reference a product exceeds a minimum threshold number of comments 110a-110d.

In addition, the potential for abuse can be limited by preventing particular comments 110a-110d or comments 110a-110d from particular sources from having excessive weight in determining quality rankings. A number of techniques can be employed to prevent abuse. For example, the system 104 can weight the impact of each of the comments 110a-110d based on the reputation of a consumer identity associated with the comment 110a-110d (for example, the identity of consumer that submitted the comment). To implement these techniques, the server system 104 can determine the source of the comments 110a-110d. For example, comments 110a-110d can be determined to be associated with individual consumers or with individual user accounts. Comments 110a-110d associated with an identity of a consumer can be given more weight in determining product quality rankings than comments that are anonymous. Likewise, comments 110a-110d associated with consumers with high reputations can be given more weight than comments 110a-110d associated with consumers with low reputations.

Even though measures to prevent abuse can be included, a distribution of quality generally should not be assumed. In some instances, overwhelmingly negative opinions of a product may be an accurate indication that the quality of the product is very low.

During action (F), the server system 104 receives a request 116 from the client device 102. For example, the client device 102 may request a web page 118 associated with product B.

During action (G), the server system 104 responds to the request by providing a web page associated with Product B. The server system 104 provides cross-referenced information determined from the comments 110a-110d. That is, the server system 104 provides information based on the identified references 112a-112h, the identified relationships 114a-114e, and correlations between the relationships 114a-114e. This information can be cross-referenced with information determined from comments included on the web page 118 associated with Product B. Examples of cross-referenced information that can be provided are described with reference to FIG. 2.

Figure 2:
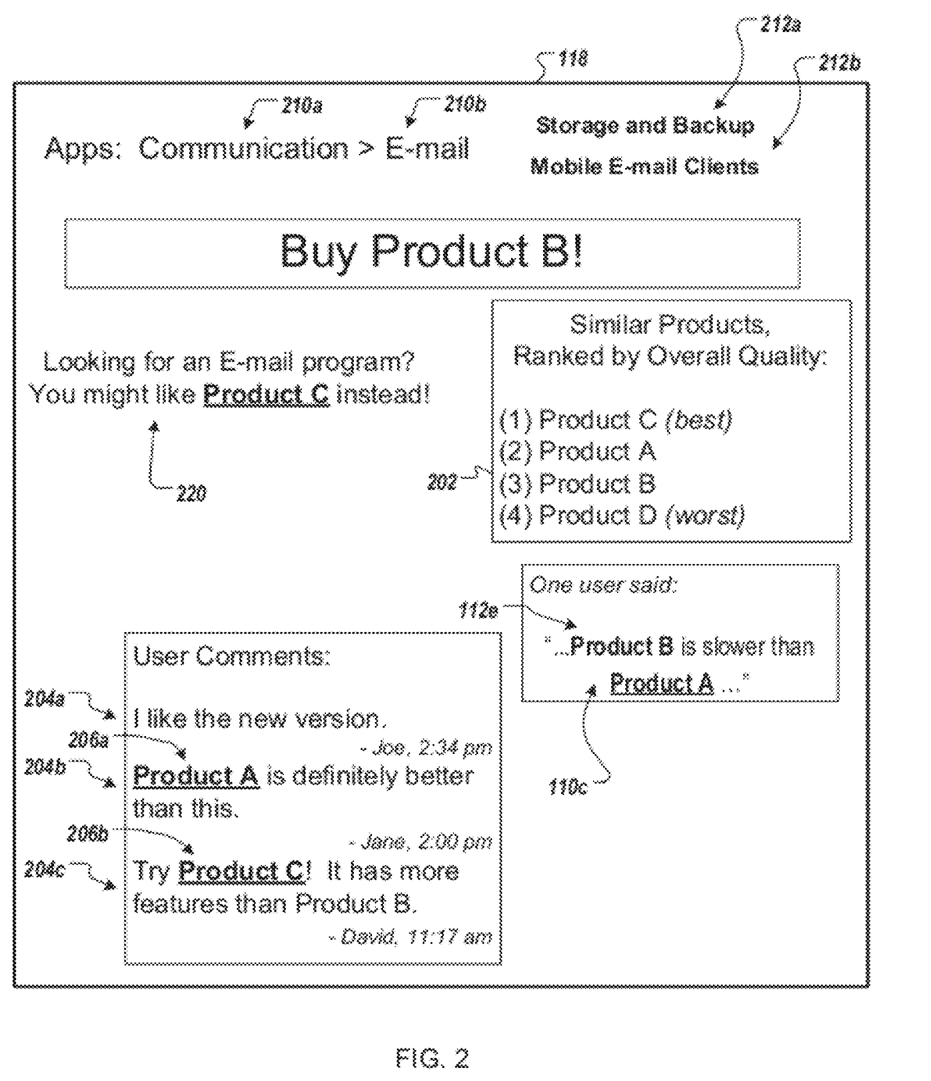
FIG. 2 is a diagram illustrating a document that includes cross-referenced information.

FIG. 2 is a diagram illustrating a document (the web page 118) that includes cross-referenced information. The document is a web page 118 that offers Product B for sale. For example, the web page 118 can be part of the same online marketplace for applications as the web page 108. Alternatively, the web page 118 and the web page 108 may be operated separately, and may even be web pages of competing vendors.

In some implementations, some or all of the web page 108 may be served by the server system 104. Alternatively, the web page 118 may be provided by a separate server system operated by a third party. The cross-referenced information may be provided to a third party system by the server system 104.

The server system 104 provides cross-referenced information by providing, for example, one or more of: (1) information identifying related products; (2) information indicating relative quality of products; (3) text of comments from other web pages; (4) hyperlinks to product references; (5) navigational tools; and/or (6) product recommendations.

(1) Information Identifying Related Products

The web page 118 can include information that identifies related products. For example, the web page 118 includes a list 202 of products that include alternatives to Product B. The list 202 can include, for example, products in a cluster that includes Product B. Products that supplement Product B may also be displayed. Other indications, including diagrams, icons, and images, can also indicate related products.

Cross-referenced information can expose consumers to new purchasing options. As an example, a game may be officially designated in a category of entertainment. The relationships 114a-114e identified in comments 110a-110d may indicate, however, that the game is a complement or an alternative to an educational product. As a result, the server system 104 may provide information about the game on web pages associated with related educational products, thereby broadening the group of consumers that can learn about the game.

(2) Information Indicating Relative Quality

The web page 118 indicates the relative quality of products that are related to Product B. The list 202 ranks the products in a cluster based on the cross-referenced relationships 114a-114e and the sentiment analysis described above. Importantly, the ranking can be based at least in part on the relationships 114a-114e, which can be determined from the occurrence of two or more references 112a-112h. This allows the ranking to reflect direct comparisons between products, for example. As a result, the ranking can be more accurate than a simple comparison of sentiment analysis scores for individual products.

Information indicating the relative quality of products can be located, for example, near a comment 110a-110d, 204a-204c that references a product that is ranked in terms of quality. The information indicating relative quality can also be displayed or located at other portions of a web page 108, 118.

In some implementations, numerical scores or other indications of quality can also be provided. Rankings and scores for related products can also be provided for relative particular aspects of the products, such as speed, reliability, durability, and so on.

(3) Text of Comments from Other Web Pages

The web page 118 can include the text of a comment 110c from the web page 108. The server system 104 can provide the text of comments 110a-110d from one web site on another web site to aid consumers. Because the comment 110c includes the reference 112e to Product B, the server system 104 can provide the comment 110c on the web page 118 for Product B, even though the comment 110c was submitted on the web page 108 for product A.

(4) Adding Hyperlinks

The web page 118 can include comments 204a-204c submitted by consumers that visit the web page 118. The server system 104 can identify references 206a-206b that occur in the comments 204a-204c, and can add hyperlinks to the references 206a-206b. The hyperlinks can reference a web page that provides information about the referenced product. For example, the reference 206a mentions Product A, so the hyperlink for the reference 206a can link to the web page 108 for Product A. Hyperlinks can also link to other types of information, for example, product reviews or third-party comparisons of products.

(5) Adjusting Navigation Options and Web Page Organization

Clusters of related products can be used to provide fine-grained navigational options to consumers. In some instances, a web page 118 can include navigational tools that use information determined from cross-referenced comments 110a-110d, 204a-204c. For example, an online marketplace or other web page may allow a consumer to navigate through hierarchical categories 210a-210b of products. A broad category 210a may include products relating to "communication" and a narrower category 210b may include products related to "e-mail." In addition to standard, human-selected categories 210a-210b, additional sub-categories 212a-212b can be created based on the relationships 114a-114e between products. The sub-categories 212a-212n can be listed so that consumers may select one of the sub-categories 212a-212b to navigate to a site that lists or describes products in a sub-category 212a-212b.

Each sub-category 212a-212b can include related products, for example, the products in a cluster. The sub-category 212a may include, for example, applications that have features for e-mail storage and backup. The sub-category 212b may include, for example, applications that are e-mail clients for mobile devices. The number of sub-categories 212a-212b indicated on a web page 118, the types and names of the sub-categories 212a-212b, and the products included in each sub-category 212a-212b can change dynamically as new relationships 114a-114e are determined.

(6) Product Recommendations

The web page 118 can suggest products based on the cross-referenced relationships 114a-114e. For example, the web page 118 includes a recommendation 220 to purchase Product C, the highest quality product in the cluster. Product recommendations can be provided with consumer comments or the results of sentiment analysis to support the recommendations.

In addition, product recommendations can identify complementary products to "upsell" products to consumers. For example, products that have been identified as supplements to Product B based on the comments 110a-110d (or based on the comments 204a-204c) may be recommended on the web page 118.

Figure 3:
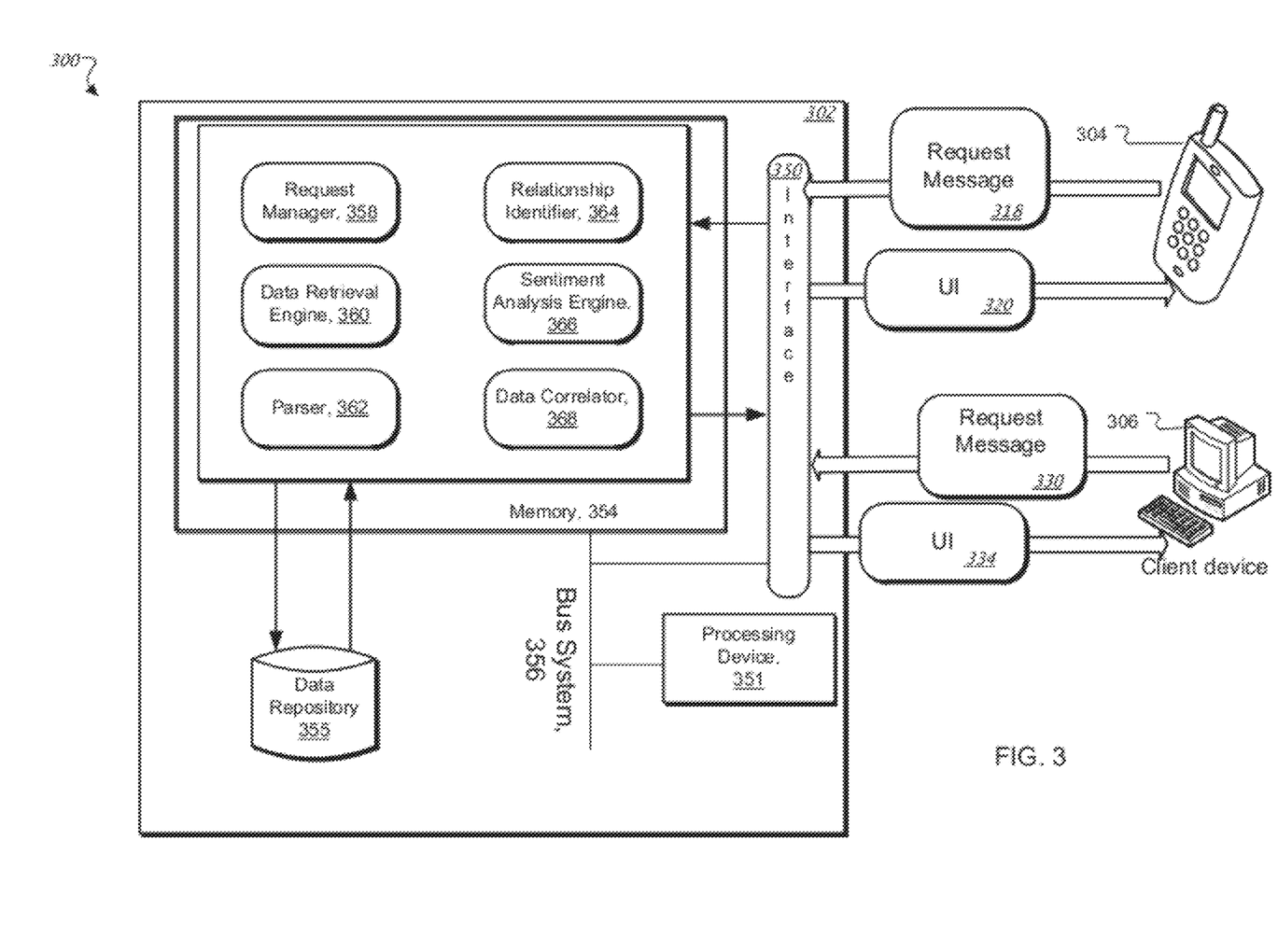
FIG. 3 is a block diagram of components of a system for cross-referencing comments.

FIG. 3 is a block diagram of components of a system 300 for cross-referencing comments.

Client devices 304, 306 can be any sort of computing devices capable of taking input from a user and communicating over a network (not shown) with server 302 and/or with other client devices. For example, client devices 304, 306 can be mobile devices, desktop computers, laptops, cell phones, personal digital assistants ("PDAs"), servers, embedded computing systems, and so forth. Server 302 can be any of a variety of computing devices capable of receiving information, such as a server, a distributed computing system, a desktop computer, a laptop, a cell phone, a rack-mounted server, and so forth. Server 302 may be a single server or a group of servers that are at a same location or at different locations.

Server 302 can receive information from client devices 304, 306 via input/output ("I/O") interface 350. I/O interface 350 can be any type of interface capable of receiving information over a network, such as an Ethernet interface, a wireless networking interface, a fiber-optic networking interface, a modem, and so forth. Server 302 also includes a processing device 351 and memory 354. A bus system 356, including, for example, a data bus and a motherboard, can be used to establish and to control data communication between the components of server 302.

Processing device 351 may include one or more microprocessors. Generally speaking, processing device 351 may include any appropriate processor and/or logic that is capable of receiving and storing data, and of communicating over a network (not shown). Memory 354 can include a hard drive and a random access memory storage device, such as a dynamic random access memory, or other types of non-transitory machine-readable storage devices. The memory can include a data repository 355, such as a database, that stores information used by the server 302. As shown in FIG. 3, memory 354 stores computer programs that are executable by processing device 351. Among these computer programs are request manager 358, data retrieval engine 360, parser 362, relationship identifier 364, sentiment analysis engine 366, and data correlator 368, each of which are described in further detail below.

Request manager 358 is configured to receive a request message (e.g., request messages 318, 330) and process the request. Request manager 358 may determine the information needed to fulfill the request and respond to the request when the appropriate information is available.

Data retrieval engine 360 is configured to retrieve information from documents, including web pages. The data retrieval engine 360 can retrieve information over a network or from a cache or index. A cache or index of the content of one or more web pages can be stored in the data repository 355.

Parser 362 is configured to parse information retrieved by the data retrieval engine 360. In particular, the parser 362 is configured to identify unstructured text in documents, and, for example, to identify unstructured, consumer-generated text in documents. In other words, the parser 362 can be configured to distinguish consumer-generated text from other unstructured text in a document. The parser 362 is also configured to identify references to products and providers in the unstructured text and other portions of documents. The parser 362 can use full string, sub-string, and common misspelling matching techniques to identify references to products and providers. The parser 362 can access a list of identifiers for products and providers in the data repository 355 and can identify occurrences of those identifiers in the consumer-generated text.

Relationship identifier 364 is configured to determine relationships between products and providers based on references identified by the parser 362. The relationship identifier 364 can determine, for example, whether two products are indicated to be alternatives or complements for each other based on the content of unstructured text. In addition, the relationship identifier 364 can determine whether comparisons are made between products or providers in unstructured text. The relationship identifier 364 can identify clusters of related products and providers.

Figure 4:
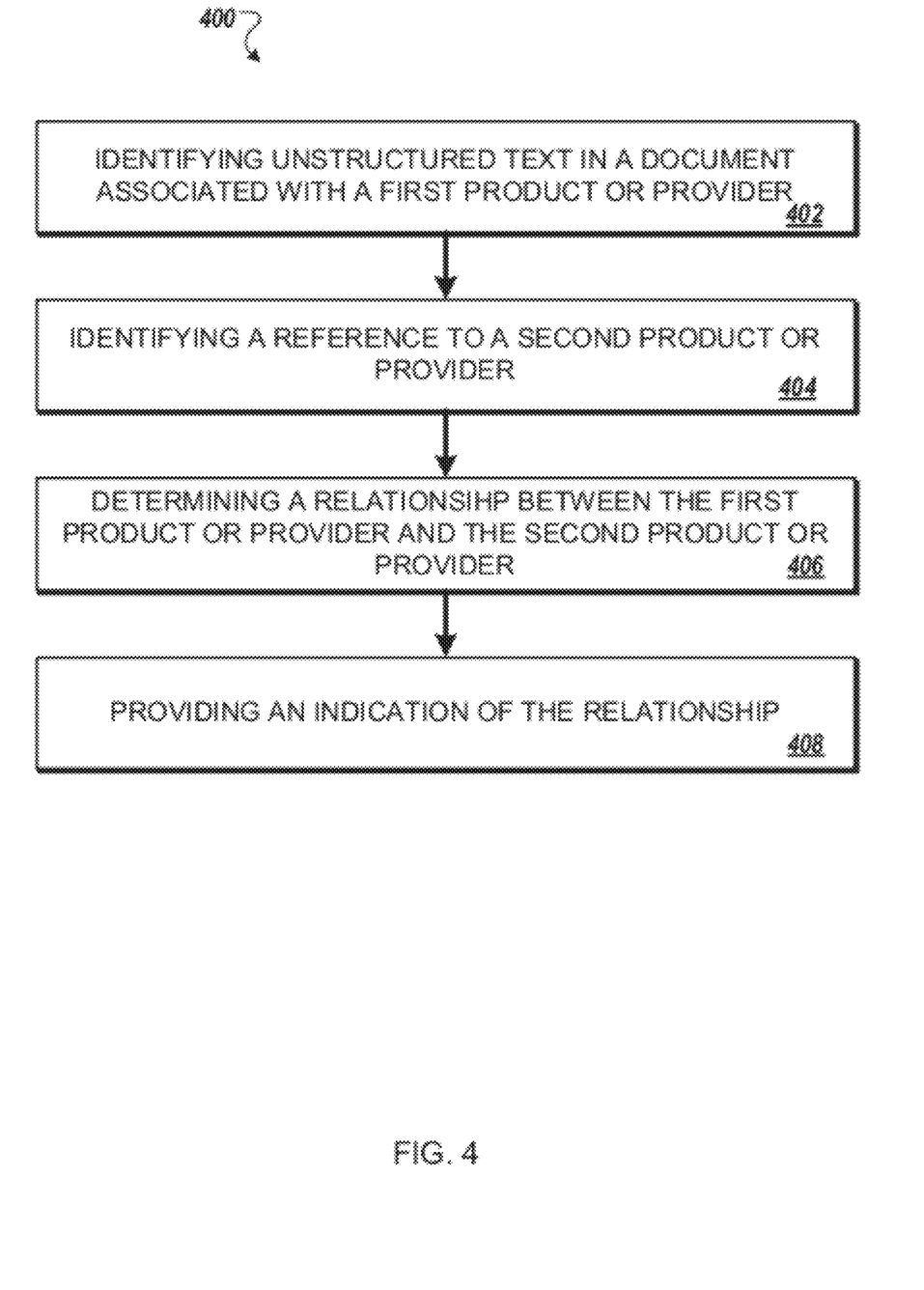
FIG. 4 is a flow diagram illustrating an example of a process for cross-referencing comments.

FIG. 4 is a flow diagram illustrating an example of a process 400 for cross-referencing comments that may be implemented on the systems shown in FIGS. 1 and 3. Process 400 may be executed on server system 104, for example. Briefly, the process 400 includes identifying unstructured text in a document associated with a first product or provider, identifying a reference to a second product or provider in the unstructured text, determining a relationship between the first product or provider and the second product or provider based on the content of the unstructured text, and providing an indication of the relationship for display on a document associated with the first product or provider or the second product or provider.

In more detail, unstructured text is identified in a document associated with a first product or provider (402). For example, referring also to FIG. 1, the unstructured text can include a comment 110a-110d associated with a web page 108 offering the first product for sale, for example a consumer-generated comment.

A document can be determined to be associated with a first product or provider based on a reference to the first product or provider in the content of the document or metadata for the document. For example, a reference to the first product or provider can be identified in the document outside the identified unstructured text (e.g., in the title or other content of the web page 108).

A reference to a second product or provider is identified in the unstructured, consumer-generated text (404). For example, in FIG. 1, one or more of the references 112b, 112d, 112e, 112h can be determined.

A relationship between the first product or provider and the second product or provider is determined based on the content of the unstructured text (406). For example, the first product and the second product can be determined to be supplements or alternatives based on the comments. To determine a relationship (such as the relationships 114a-114e in FIG. 1), a direct comparison between the first product or provider and the second product or provider can be identified.

The relationship between the first product or provider and the second product or provider can be inferred from the content of the unstructured text, without accessing a database or other source of information describing known relationships between products and providers. The determined relationship between the first product or provider and the second product or provider can thus be a relationship indicated by the unstructured text and the association of the unstructured text with the document in which the unstructured text occurs. Thus even if some relationships between the first product or provider and the second product or provider may be accessible from other sources, one or more relationships indicated by the unstructured text are determined. This permits, for example, comparison of different relationships between the first product or provider and the second product or provider indicated by different unstructured text segments, and counts of the frequency that the different relationships are indicated in different unstructured text segments in different documents.

An indication of the relationship is provided for display on a document associated with the first product or provider or the second product or provider (408). For example, purchase of the second product can be suggested. As another example, purchase of the first product can be suggested on a web page associated with the second product (e.g., the web page 118). Providing an indication of the relationship can include cross-referencing the unstructured text (e.g., comments 110a-110d from the web page 108) with second unstructured text (e.g., the comments 204a-204c) in a second document (e.g., the web page 118). Relationships determined based on unstructured text segments from different documents can be indicated.

As another example, a navigational tool can be provided based on the relationship. Information identifying one or more sub-categories of related products (e.g., subcategories 212a-212b of FIG. 2) can be presented on a user interface. A user to select one of the sub-categories to navigate to a document that provides information about the products in the selected sub-category. The sub-categories can be automatically and dynamically generated and/or updated, for example, based on one or more relationships determined based on comments 110a-110d.

The process 400 can include adding a hyperlink to the reference to the second product or provider. The hyperlink can provide access to information associated with the second product or provider.

The process 400 can include ranking the first product or provider and the second product or provider based on the relationship. The ranking of the first product or provider and the second product or provider can be indicated.

Figure 5:
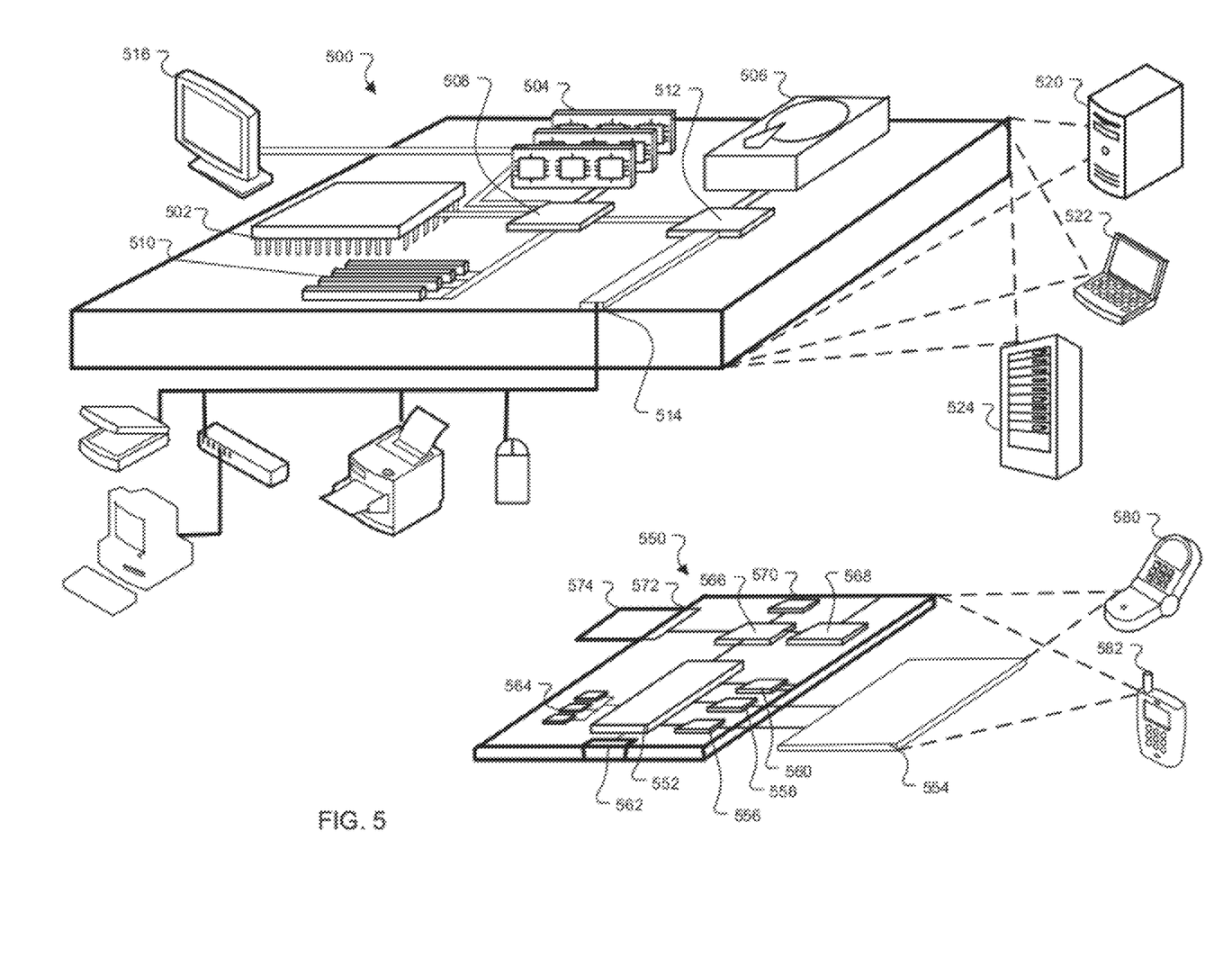
FIG. 5 is a block diagram of computing devices that may be used to implement the systems and methods described in this document.

The process 400 can include identifying a reference to the first product or provider in the unstructured text (e.g., one or the references 112a, 112c, 112f, 112g which refer to Product A and occur in the comments 110a-110d). The identified reference to the first product or provider can be used to determine the relationship with the second product or provider FIG. 5 is a block diagram of computing devices 500, 550 that may be used to implement the systems and processes described in this document, including client device 102, 504 and server system 104, 502. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface controller 508 connecting to memory 504 and high-speed expansion ports 510, and a low speed interface controller 512 connecting to a low-speed expansion port 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to the high-speed interface controller 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high-speed interface controller 508 manages bandwidth-intensive operations for the computing device 500, while the low-speed interface controller 512 manages lower bandwidth-intensive operations. Such allocation of functions is exemplary only. In one implementation, the high-speed interface controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing devices 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive, solid state storage component, or other device, to provide additional storage. Each of the components 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 502 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

The computing system can include clients and servers. A client and server are generally remote from each other and typically interact through a communication network. The relationship of client and server arises by virtue of computer programs running on the respective computers and having a client-server relationship to each other.

Actions (A) to (G) of FIG. 1 may be performed in any appropriate order, and are not limited to the order described. The same is true for the actions shown in FIG. 4.

Although a few implementations have been described in detail above, other modifications are possible. Moreover, other mechanisms for cross-referencing comments may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method comprising:
   providing a document that includes a navigational tool configured to permit navigation among hierarchical categories of products, the navigational tool presenting a first set of sub-categories each corresponding to a different cluster of products;
   identifying unstructured text of one or more consumer-submitted comments in a document associated with a first product;
   identifying, in the unstructured text of the one or more consumer-submitted comments, a reference to a second product different from the first product;
   determining one or more relationships between the first product and the second product based on content of the unstructured text of the one or more consumer-submitted comments;
   in response to determining the one or more relationships between the first product and the second product, including the first product and the second product in a cluster of related products;
   in response to determining the one or more relationships between the first product and the second product, changing the first set of sub-categories to generate a second set of sub-categories different from the first set of sub-categories, the second set of sub-categories comprising a sub-category that corresponds to the cluster that includes the first product and the second product; and
   after changing the first set of sub-categories, providing the document that includes the navigational tool such that the navigational tool presents the second set of sub-categories,
   wherein each of the above are performed by one or more processing devices.

2. The method of claim 1, further comprising adding a hyperlink to the identified reference to the second product in the unstructured text of the one or more consumer-submitted comments, the hyperlink providing access to information associated with the second product.

3. The method of claim 1, wherein the one or more consumer-submitted comments are associated with a web page offering the first product for sale.

4. The method of claim 1, wherein determining the one or more relationships comprises determining, based on the unstructured text, that the first product and the second product are supplements to each other.

5. The method of claim 1, wherein determining the one or more relationships comprises identifying a direct comparison between the first product and the second product.

6. The method of claim 1, further comprising:
   ranking the first product and the second product based on the one or more relationships; and providing an indication of the ranking of the first product and the second product for display.

7. The method of claim 1, further comprising suggesting purchase of the second product in response to determining the one or more relationships between the first product and the second product.

8. The method of claim 1, further comprising suggesting, on a web page associated with the second product, purchase of the first product in response to determining the one or more relationships between the first product and the second product.

9. The method of claim 1, wherein determining the one or more relationships comprises determining that the first product and the second product are alternatives based on the content of the unstructured text; and
   including the first product and the second product in the cluster of similar products occurs in response to determining that the first product and the second product are alternatives.

10. The method of claim 1, wherein changing the first set of sub-categories to generate the second set of sub-categories comprises one or more of
   generating the second set of sub-categories to include a number of sub-categories different from the number of sub-categories included in the first set of sub-categories,
   changing a type of one of the sub-categories included in the first set of sub-categories, and
   changing a name of one of the sub-categories included in the first set of sub-categories.

11. The method of claim 1, wherein at least a portion of the unstructured text does not include a comparison between the first product and the second product, and
   determining the one or more relationships comprises determining a relationship between the first product and the second product based on the portion of the unstructured text that does not include a comparison between the first product and the second product.

12. A system comprising:
   one or more computers; and
   a computer-readable medium coupled to the one or more computers having instructions stored thereon which, when executed by the one or more computers, cause the one or more computers to perform operations comprising:
      providing a document that includes a navigational tool configured to permit navigation among hierarchical categories of products, the navigational tool presenting a first set of sub-categories each corresponding to a different cluster of products;
      identifying unstructured text of one or more consumer-submitted comments in a document associated with a first product;
      identifying, in the unstructured text of the one or more consumer-submitted comments, a reference to a second product different from the first product;
      determining one or more relationships between the first product and the second product based on content of the unstructured text of the one or more consumer-submitted comments;
      in response to determining the one or more relationships between the first product and the second product, including the first product and the second product in a cluster of related products;
      in response to determining the one or more relationships between the first product and the second product, changing the first set of sub-categories to generate a second set of sub-categories different from the first set of sub-categories, the second set of sub-categories comprising a sub-category that corresponds to the cluster that includes the first product and the second product; and
      after changing the first set of sub-categories, providing the document that includes the navigational tool such that the navigational tool presents the second set of sub-categories.

13. The system of claim 12, wherein determining the one or more relationships comprises determining, based on the unstructured text, that the first product and the second product are supplements to each other.

14. The system of claim 12, wherein determining the one or more relationships comprises identifying a direct comparison between the first product and the second product.

15. The system of claim 12, wherein the operations further comprise:
   ranking the first product and the second product based on the one or more relationships; and
   providing an indication of the ranking of the first product and the second product for display.

16. The system of claim 12, wherein the operations further comprise suggesting purchase of the second product.

17. A computer-readable medium encoded with a computer program, the program comprising instructions that when executed by one or more computers cause the one or more computers to perform operations comprising:
   providing a document that includes a navigational tool configured to permit navigation among hierarchical categories of products, the navigational tool presenting a first set of sub-categories each corresponding to a different cluster of products;
   identifying unstructured text of one or more consumer-submitted comments in a document associated with a first product;
   identifying, in the unstructured text of the one or more consumer-submitted comments, a reference to a second product different from the first product;
   determining one or more relationships between the first product and the second product based on content of the unstructured text of the one or more consumer-submitted comments;
   in response to determining the one or more relationships between the first product and the second product, including the first product and the second product in a cluster of related products;
   in response to determining the one or more relationships between the first product and the second product, changing the first set of sub-categories to generate a second set of sub-categories different from the first set of sub-categories, the second set of sub-categories comprising a sub-category that corresponds to the cluster that includes the first product and the second product; and
   after changing the first set of sub-categories, providing the document that includes the navigational tool such that the navigational tool presents the second set of sub-categories.

18. The computer-readable medium of claim 17, wherein determining one or more relationships comprises determining, based on the unstructured text, that the first product and the second product are supplements to each other.

19. The computer-readable medium of claim 17, wherein determining one or more relationships comprises identifying a direct comparison between the first product and the second product.

20. The computer-readable medium of claim 17, wherein the operations further comprise:

ranking the first product and the second product based on the one or more relationships; and
providing an indication of the ranking of the first product and the second product for display.

21. The computer-readable medium of claim 17, wherein the operations further comprise suggesting purchase of the second product in response to determining the one or more relationships between the first product and the second product.

* * * * *